United States Patent [19]

Grot

[11] B 3,925,135

[45] Dec. 9, 1975

[54] METHOD OF MAKING LAMINATES OF SUPPORT MATERIAL AND FLUORINATED POLYMER CONTAINING PENDANT SIDE CHAINS CONTAINING SULFONYL GROUPS

[75] Inventor: Walther Gustav Grot, Chadds Ford, Pa.

[73] Assignee: E. I. Du Pont de Nemours and Company, Wilmington, Del.

[22] Filed: Aug. 1, 1973

[21] Appl. No.: 384,499

[44] Published under the Trial Voluntary Protest Program on January 28, 1975 as document no. B 384,499.

Related U.S. Application Data

[62] Division of Ser. No. 196,772, Nov. 8, 1971, Pat. No. 3,770,567.

[52] U.S. Cl. ......... 156/213; 156/306; 260/79.3 MU
[51] Int. Cl.². B32B 7/04; B32B 17/04; B32B 27/06
[58] Field of Search ............ 117/126 GB, 138.8 UF; 156/285, 298, 306, 382, 213; 161/189, 204, 254, 256; 260/79.3 M, 79.3 MU; 427/385; 428/421, 442, 520, 522

[56] References Cited
UNITED STATES PATENTS

| | | | |
|---|---|---|---|
| 2,393,967 | 2/1946 | Brubaker | 260/92.1 |
| 2,773,781 | 12/1956 | Rodman | 161/189 X |
| 3,041,317 | 6/1962 | Gibbs et al. | 260/79.3 MU |
| 3,501,360 | 3/1970 | Mancel | 156/153 |
| 3,676,290 | 7/1972 | Hetrick | 161/189 |
| 3,692,569 | 9/1972 | Grot | 117/138.8 UF |
| 3,718,627 | 2/1973 | Grot | 260/79.3 MU |
| 3,723,234 | 3/1973 | MacDonald | 161/89 |
| 3,784,399 | 1/1974 | Grot | 117/62.1 |

Primary Examiner—Charles E. Van Horn
Assistant Examiner—Robert A. Dawson

[57] ABSTRACT

A laminate comprising a first layer of fluorinated polymer containing pendant side chains containing sulfonyl groups wherein the sulfonyl groups are in the $-(SO_3)_n Me$ form wherein Me is a metallic cation or $NH_4$ and n is the valence of Me and a second layer of fluorinated polymer containing pendant side chains containing sulfonyl groups wherein the sulfonyl groups are in the $-SO_2M$ form wherein M is a halogen atom, said second layer being integral with said first layer and containing support material completely encapsulated therein; and a process for preparing such; said laminate being useful as an intermediate for an ion exchange membrane.

4 Claims, No Drawings

METHOD OF MAKING LAMINATES OF SUPPORT MATERIAL AND FLUORINATED POLYMER CONTAINING PENDANT SIDE CHAINS CONTAINING SULFONYL GROUPS

This is a division of application Ser. No. 196,772, filed Nov. 8, 1971 and now U.S. Pat 3,770,567.

This invention relates to laminates of support material and fluorinated polymers containing pendant side chains containing sulfonyl groups, the sulfonyl groups of one surface being in the $-(SO_3)_n$Me form wherein Me is a metallic cation or $NH_4$ and n is the valence of Me while the sulfonyl groups of the other surface are in the $-SO_2M$ form wherein M is a halogen atom; the support material being completely encapsulated within the fluorinated polymer. This invention also relates to a process for preparing the laminate which involves differential pressure lamination.

Fluorinated polymers containing pendant side chains containing sulfonyl groups are known. Their use as ion exchange membranes is also known. It is desirable to have an ion exchange membrane which is supported, i.e., contains a material which imparts physical strength to the fluorinated polymer which is greater than that of a mere film of the fluorinated polymer. Heretofore, methods for supporting such membranes have not been sufficient for if complete encapsulation of the support material were to be assured, excessively thick films of fluorinated polymer were required. Such excessive film thickness increases the cost of the membrane and reduces the usefulness of the membrane for ion exchange purposes. If the support is not completely encapsulated, the membrane will leak and its usefulness is reduced.

A process has been developed which allows for complete encapsulation of support material into fluorinated polymer containing pendant side chains containing sulfonyl groups without the problems as set forth above. The process results in a laminate and comprises (1) contacting the $-SO_2M$ surface of a film of a fluorinated polymer containing pendant side chains containing sulfonyl groups wherein the sulfonyl groups of one surface of said film are in the $-SO_2M$ form wherein M is a halogen atom and the sulfonyl groups of the other surface of the film are in the $-(SO_3)_n$Me form wherein Me is a metallic cation or $NH_4$ and n is the valence of Me with a support material and (2) applying a differential pressure to the contacted support material and film, the pressure on the opposite surface of the support material from that which is contacting said fluorinated polymer film being at least 5 inches of mercury less than the pressure on the surface of the fluorinated polymer film opposite to that contacting the support material, for a sufficient period of time to cause the support material which is in contact with said film to become completely encapsulated within the film of fluorinated polymer while heating the film and support material at from 240°–320°C. The laminate which results from the process comprises a first layer of fluorinated polymer containing pendant side chains containing sulfonyl groups wherein the sulfonyl groups are in the $-(SO_3)_n$Me form wherein Me is a metallic cation or $NH_4$ and n is the valence of the cation and a second layer of fluorinated polymer containing pendant side chains containing sulfonyl groups wherein the sulfonyl groups are in the $-SO_2M$ form wherein M is a halogen atom, said second layer being integral with said first layer and containing support material completely encapsulated therein. This laminate is relatively dimensionally stable and is resistant to tearing.

The use of complete encapsulation throughout means that the support material which is in contact with the fluorinated polymer is completely encapsulated. Thus, both in the process for preparing the laminate and the laminate itself, the support material can be larger in area than the film of fluorinated polymer and the excess area of unencapsulated support material can extend from the sides of the laminate. This excess is normally trimmed off before the laminate is utilized as an ion exchange membrane. The encapsulation of the support material is sufficient to form a continuous film of fluorinated polymer on the opposite surface of the support material from that originally contacting the fluorinated polymer film. There can be sufficient fluorinated polymer to fill the entire thickness of the fabric and produce a uniformly thick laminate. Preferably, however, there is not enough fluorinated polymer to fill the entire thickness of the fabric. Thus, the film of fluorinated polymer while completely encapsulating the support material with which it is in contact follows the configuration of the support material on the surface of the support material which originally contacted the fluorinated polymer film. The sulfonyl groups of the surface of the film of fluorinated polymer thus following the configuration of the support material are those in the $-(SO_3)_n$Me form as is described above.

The second layer of the laminate contains sulfonyl groups which are in the $-SO_2M$ form. As stated above, M is a halogen atom. Preferred halogen atoms are F or Cl, the former being most preferred. The first layer of the laminate is in the $-(SO_3)_n$Me form wherein Me is a metallic cation or $NH_4$ and n is the valence of Me. Me is preferably a member of the class consisting of cation of an alkali metal and cation of an alkaline earth metal. The most preferred are the cations of the alkali metals; in particular, Na or K; the former being the most preferred.

The film of this invention is a fluorinated polymer containing pendant side chains containing sulfonyl groups. The polymers are prepared from monomers which are fluorinated or fluorine substituted vinyl compounds. The polymers are made from at least two monomers with at least one of the monomers coming from each of the two groups described below. The first group is fluorinated vinyl compounds such as vinyl fluoride, hexafluoropropylene, vinylidene fluoride, trifluoroethylene, chlorotrifluoroethylene, perfluoro(alkylvinyl ether), tetrafluoroethylene and mixtures thereof.

The second group is the sulfonyl-containing monomers containing the usual precursor $-SO_2F$. Additional examples can be represented by the generic formula $CF_2=CFR_fSO_2F$ wherein $R_f$ is a bifunctional perfluorinated radical comprising one to eight carbon atoms. The particular chemical content or structure of the radical linking the sulfonyl group to the copolymer chain is not critical but such must have a fluorine atom attached to the carbon atom to which is attached the sulfonyl group if the sulfonyl group is in the $-(SO_2NH)_mQ$ form (discussed later) wherein Q is H, cation of an alkali metal or cation of an alkaline earth metal and m is the valence of Q. If the sulfonyl group is attached directly to the chain, the carbon in the chain to which it is attached must have a fluorine atom attached to it if the sulfonyl group is in the $-(SO_2NH)_mQ$ form. The $R_f$ radical of the formula above can be either branched or unbranched, i.e., straight chain and can have one or more ether linkages. It is preferred that the vinyl radical in the group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are

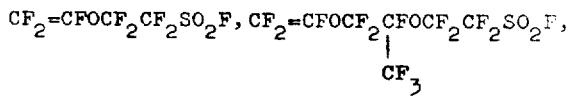

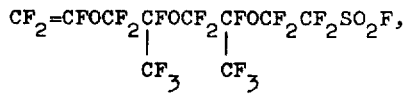

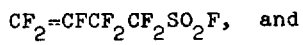

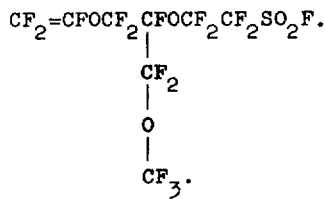

The most preferred sulfonyl fluoride containing comonomer is perfluoro(3,6-dioxa-4-methyl-7-octenesulfonyl fluoride),

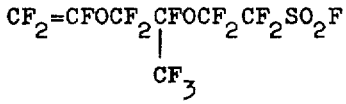

The sulfonyl-containing monomers are disclosed in such references as U.S. Pat. No. 3,282,875 to Connolly et al., U.S. Pat. No. 3,041,317 to Gibbs et al., and U.S. Pat. No. 3,560,568 to Resnick and in U.S. patent application Ser. No. 779,273, to Grot filed on Nov. 26, 1968 and now U.S. Pat. No. 3,718,627

The preferred copolymers utilized in the film are perfluorocarbon although others can be utilized. The most preferred copolymer is a copolymer of tetrafluoroethylene and perfluoro(3,6-dioxa-4-methyl-7-octenesulfonyl fluoride) which comprises 20 to 60 percent, preferably, 30 to 50 percent by weight of the latter.

The copolymer used in the present invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962, that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0–200°C. and at pressures in the range 1–200, or more, atmospheres. The nonaqueous polymerization may, if desired, be carried out in the presence of a fluorinated solvent. Suitable fluorinated solvents are 1,1,2-trichloro-1,2,2-trifluoroethane and inert liquid, perfluorinated hydrocarbons, such as perfluoromethylcyclohexane, perfluorodimethylcyclobutane, perfluorooctane, and the like.

Aqueous techniques for preparing the copolymer of this invention include contacting the monomers with an aqueous medium containing a free-radical initiator to obtain a slurry of polymer particles in nonwater-wet or granular form, as disclosed in U.S. Pat. No. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example in U.S. Pat. No. 2,559,752, issued to K. L. Berry on July 10, 1951, and U.S. Pat. No. 2,593,583, issued to J. F. Lontz on Apr. 22, 1952.

Preparation of the film into which the support material is encapsulated normally begins with a film of fluorinated polymer which contains sulfonyl groups in the form of $—SO_2F$. The surface of the film which becomes part of the first layer of the laminate and in which the sulfonyl groups are in the $—(SO_3)_nMe$ form is converted to such form by contacting one surface of a film with all the sulfonyl groups in the $—SO_2F$ form with $Ma(OH)_p$, wherein $p$ is the valence of Ma and Ma is $NH_4$, cation of an alkali metal or cation of an alkaline earth metal. Preferably, Ma is a cation of an alkali metal, in particular sodium or potassium. This converts the surface which is contacted with the $Ma(OH)_p$ to the $—(SO_3)_nMe$ form wherein Me is Ma. The thickness of the surface (the first layer of a laminate which is converted to the $—(SO_3)_nMe$ form is that amount which will be sufficient to allow the film to have sufficient physical strength to maintain the integrity of the film during the encapsulation of the supporting material. This is normally at least 10 microns. The remainder of the film (the second layer of the laminate) is in the $—SO_2M$ form which is the form that is conducive to differential pressure encapsulation of the supporting material. There should be enough of this second layer present before the support material is encapsulated therein to allow for the subsequent complete encapsulation. Normally, a thickness of at least 50 microns is required. A film of the fluorinated polymer in which the sulfonyl groups are in the $—SO_2M$ form is physically less strong than the $—(SO_3)_nMe$ form. Therefore, the latter is required for at least part of the film.

One can commence the preparation of the laminate with a film which is entirely in the $—(SO_3)_nMe$ form, by converting part or all of the film to the $—SO_2M$ form by the use of $PCl_5$ or an equivalent and then following the procedure above to convert one surface back to the $—(SO_3)_nMe$ form if all of the film was converted to the $—SO_2M$ form. In the situation where only part, i.e., one surface of the film is converted to the $—SO_2M$ form, the film is in condition for utilization in the process of encapsulation.

The process for lamination was described above. As stated above, a differential pressure is utilized which causes the surface of the support material opposite to that contacting the fluorinated polymer film to be at a pressure at least 5 inches of mercury less than the surface of the fluorinated polymer film opposite to that contacting the support material. The pressure differential is preferably at least 20 inches of mercury. The temperature at which the polymer and support member is maintained during the drawing of the film into the support material is from 240° to 320°C. with the preferred being 260° to 290°C. The process is continued until enough of the $-SO_2M$ form of the fluorinated polymer has been drawn through and around the support material so that the support is completely encapsulated. The time required varies with the film, temperature and pressure used. Normally, 2 to 15 minutes are required.

Normally, release paper will be utilized between the surface of the support material opposite to that contacting the fluorinated polymer film and the equipment on which the encapsulation process is accomplished. The release paper should have the following characteristics:

1. It should permit the passage of air so that the application of the differential pressure is effective; a very small degree of porosity is sufficient for this purpose.
2. The pores of the paper must be small enough so that the molten polymer cannot penetrate into such pores.

Paper having a clay or kaolin coating, frequently used for offset printing, meets the above requirements. It is normally desirable to apply a small quantity of a release agent to the surface of the paper which is to contact the fluorinated polymer after encapsulation. Halftone printing on the paper can be utilized in lieu of a release agent.

The support material which is utilized in the laminate must be able to withstand the temperatures involved in the encapsulation. It must also be able to withstand treatment with caustic solutions such as sodium hydroxide, or withstand treatment with ammonium hydroxide. Useful support materials which can withstand treatment with ammonium hydroxide are quartz fabric, glass mat, glass fabric, and fluorocarbon resin fabric. The fluorocarbon resin fabric can also withstand treatment with such things as sodium hydroxide. The preferred fluorocarbon resin fabric is perfluorocarbon. Examples of preferred fabrics are polytetrafluoroethylene fabric and tetrafluoroethylene/hexafluoropropylene copolymer fabric. Examples of other preferred fluorinated resin fabrics are chlorotrifluoroethylene polymer fabric, and tetrafluoroethylene/ethylene polymer fabric. The fabric is normally from 8 to 15 mils thick. If quartz fabric, glass mat, or glass fabric are utilized as the support material, the laminate shall not be post treated with hydroxides other than $NH_4OH$.

The laminate in the form in which it is produced from the process is an intermediate for an ion exchange membrane. To obtain a useful membrane, the remainder of the sulfonyl groups in the fluorinated polymer are normally converted to the $-(SO_3)_nMe$ form by contact with $Ma(OH)_p$ as is described above.

A majority of the sulfonyl groups of the remainder of the film, or a portion thereof, however, can be converted from the $-SO_2M$ form to the $-(SO_2NH)_mQ$ form wherein Q is H and m is 1 by contacting the laminate with anhydrous ammonia which can be in gaseous form, in liquid form, as a mixture with air or other gas form, in liquid form, as a mixture with air or other gas which will not react with the sulfonyl group or the rest of the polymer or ammonia in a solvent which is nonaqueous and nonreactive with the polymer such as dimethyl sulfoxide. This $-(SO_2NH)_mQ$ form wherein Q is H can be further converted to $-(SO_2NH)_mQ$ form wherein Q is cation of an alkali metal or cation of an alkaline earth metal. This is accomplished by contacting the $-(SO_2NH)_mQ$ (wherein Q is H) sulfonyl groups with the hydroxides of the cation of the alkali metal or cation of the alkaline earth metal.

The sulfonyl groups of the laminate can also be converted to the $-SO_2OH$ form. Such is prepared by contacting the laminate wherein none of the sulfonyl groups of the fluorinated polymer are the $-SO_2M$ form with acid such as hydrochloric, sulfuric or nitric. This will convert any of the $-(SO_3)_nMe$ form sulfonyl groups to $-SO_2OH$ and $-(SO_2NH)_mQ$ to the $SO_2NH_2$ form. To prepare a laminate wherein the sulfonyl groups are in a salt form of cations which form weaker bases than those of Ma, the additional step of ion exchange of the cation with the $-SO_2OH$ form or $-(SO_3)_nMa$ is required. The copper salt can be prepared in such a manner.

A variation of a laminate which contains a layer of fluorinated polymer containing pendant side chains containing sulfonyl groups a majority of which are in the $-SO_2NH)_mQ$ form is a laminate comprising a first layer of fluorinated polymer containing pendant side chains containing sulfonyl groups which are attached to carbon atoms which have at least one fluorine atom attached thereto wherein a majority of the sulfonyl groups are in the $-(SO_2NH)_mQ$ form, Q being selected from the group consisting of H, cation of an alkali metal and cation of an alkaline earth metal and m being the valence of Q; a second layer of fluorinated polymer containing pendant side chains containing sulfonyl groups wherein the sulfonyl groups are in the $-(SO_3)_nMe$ form, Me being a metallic cation or $NH_4$ and n being the valence of Me, said second layer being integral with said first layer; and a third layer of fluorinated polymer containing pendant side chains containing sulfonyl groups wherein the sulfonyl groups are in the $-SO_2M$ form wherein M is a halogen atom, said third layer being integral with said second layer and containing support material completely encapsulated therein. The above description for preparation of the layers of the laminate and of the preferred forms of the various layers applies also to the laminate described in this paragraph. The first layer of the laminate described in this paragraph will normally be at least 200 A thick. The laminate can be converted to other forms as is described above for the other laminates.

The process for preparing the laminate of the preceding paragraph comprises (1) contacting the $-SO_2M$ surface of a film of fluorinated polymer containing pendant side chains containing sulfonyl groups with a support material, said film being integral and having (a) the sulfonyl groups of one surface of said film in the $-SO_2M$ form wherein M is a halogen atom, (b) the sulfonyl groups of the other surface of the film attached to carbon atoms which have at least one fluorine atom attached thereto, a majority of said sulfonyl groups being in the $-(SO_2NH)_mQ$ form wherein Q is H, cation of an alkali metal or cation of an alkaline earth metal and m is the valence of Q, and c) said surfaces of said fluorinated polymer separated by fluorinated polymer containing pendant side chains containing sulfonyl groups wherein the sulfonyl groups are in the $-(SO_3)_nMe$ form wherein Me is a metallic cation or $NH_4$ and n is the valence of Me; and (2) applying a differential pressure to the contacted support material and film, the pressure on the opposite surface of the support material from that which is contacting said fluorinated polymer film being at least 5 inches of mercury less than the pressure on the surface of the fluorinated polymer film opposite to that contacting the support material for a sufficient period of time to cause the support material to become completely encapsulated within the film of fluorinated polymer while heating the film and support material at from 240°–320°C.

All of the above laminates are useful as ion exchange membranes except for the membrane which has the sulfonyl groups of one surface in the —SO₂M form. The latter is useful as an intermediate for an ion exchange membrane. The most useful ion exchange membranes are those wherein the laminate has the sulfonyl groups of one surface in the —(SO₃)$_n$Me form, particularly where Me is sodium, and the sulfonyl groups of the other surface in the —(SO₂NH)$_m$Q form, particularly where Q is Na or H and $m$ is one. These ion exchange membranes are useful for normal ion exchange purposes. Membranes which contain fluorocarbon resin fabric support are particularly useful in a chloroalkali cell.

The following Examples are meant to illustrate but not to limit the invention. All parts and percentages are by weight unless otherwise specified.

EXAMPLE I

A 0.003 to 0.004 inch thick film of a copolymer of tetrafluoroethylene and

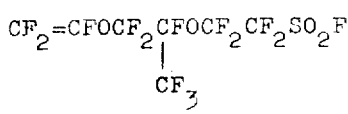

(mole ratio of the former to the latter was 7.5:1) having the sulfonyl groups of the polymer in the —SO₂F form was exposed on one surface for 8 hours to a solution of 150 grams sodium hydroxide and 200 mls. of dimethyl sulfoxide in one liter of water. This resulted in the conversion of the sulfonyl groups of 0.0007 inch of the film to the —SO₃Na form. This film was utilized in the lamination process described below.

The laminating equipment utilized in the lamination process consisted of an aluminum plate one-half inch thick with a series of grooves machined into the top surface to distribute the differential pressure across the top of the plate. The differential pressure was applied through a hole drilled in the side of the plate, the hole being connected with the grooves on the top of the plate. A 60 mesh wire screen was placed on the plate to further distribute the differential pressure to every point on the top surface. On top of the wire screen was placed a sheet of asbestos paper which acted as the support for the release paper which formed the surface on which the actual lamination was performed. The paper utilized was Mead BS 80, offset enamel paper (Mead Papers, Inc., Dayton 2, Ohio). The support material which was a piece of "Teflon" fluorocarbon resin fabric (polytetrafluoroethylene) (pattern T20–44G made by Stern & Stern Textiles, Inc., 1359 Broadway, New York, N. Y.) was placed on the release sheet. On top of the fabric had been placed the film described above with the —SO₂F surface against the fabric. The fluorinated polymer film was slightly larger than the other components so that by taping the edge of the fluorinated polymer sheet against the aluminum plate, an airtight package was obtained.

A hydraulic press was used as a heat source in the lamination process. However, the press did not apply pressure to the sample at any time. The press consisted of an electrically heated hot plate (24 inch × 30 inch). This hot plate was actually the lower platen of the hydraulic press and could be raised and lowered. Suspended above this was a 1 inch thick aluminum plate which was covered with one inch of glass wool insulation. This aluminum plate was heated prior to the experiment by raising the heated lower platen to make contact with the aluminum plate. After the aluminum plate reached the desired temperature, the bottom platen was lowered.

A differential pressure of 20 inches of mercury was applied to the laminating equipment described above and it was inserted into the press. The bottom platen was raised so that there was a one half inch clearance between the laminating equipment and the top plate of the press. The press had been preheated to 281°C. at the top and an average of 287.5°C. at the bottom. The laminating equipment was left in position for 6 minutes. After 3 minutes the top temperature of the press was 278°C. and the bottom temperature was 280°C. After 5 minutes, the top temperature was 275°C. and the bottom temperature 283°C. After 6 minutes the laminating equipment was removed. The differential pressure was released after the plate had cooled to room temperature.

Examination of the laminate showed that the fabric was completely encapsulated, i.e., the fluorinated polymer in the —SO₂F form had fused together under the fabric to form a continuous unbroken surface while at the same time the fluorinated polymer in the —SO₃Na form had formed an unbroken upper surface. Some release paper stuck to the laminate. The laminate was immersed in a mixture of 150 grams of NaOH, 200 mils. dimethyl sulfoxide and one liter of water for 24 hours at 70°C. to complete the conversion of the fluorinated polymer to the —SO₃Na form. The release paper sticking to the laminate was removed during this treatment.

EXAMPLE II

The procedure of Example I was followed except for the following deviations:

1. The initial exposure of the fluorinated polymer film to the sodium hydroxide - dimethyl sulfoxide-water solution was for 20 hours.

2. The release paper utilized was 65 lbs. Webset coated book paper manufactured by Oxford Paper Company, 2770 Park Avenue, New York, N. Y.

3. The "Teflon" fabric was bleached by heating at 80°C. for 5 hours in concentrated nitric acid.

4. The initial temperature of the top plate of the press was 281°C. and the bottom was an average of 306.5°C. The temperature after 3 minutes at the top was 279°C. and at the bottom was 284.5°C. (average). The temperature after 5 minutes was 275°C. at the top and an average of 291°C. at the bottom.

5. There was no sticking of the release paper to the laminate.

6. There were dark spots on one corner of the laminate indicating insufficient cleaning of the "Teflon" fabric.

The fabric was completely encapsulated in the fluorinated polymer as in Example I.

I claim:

1. A process for preparing a laminate of a first layer of fluorinated polymer containing pendant side chains containing sulfonyl groups wherein the sulfonyl groups are in the —(SO₃)$_n$Me form wherein Me is a metallic cation or NH₄ and n is the valence of Me and a second layer of fluorinated polymer containing pendant side chains containing sulfonyl groups wherein the sulfonyl groups are in the —SO₂M form wherein M is a halogen atom, said second layer being integral with said first layer and containing support material completely encapsulated therein which comprises 1. contacting the —SO$_2$M surface of a film of a fluorinated polymer containing pendant side chains containing sulfonyl groups wherein the sulfonyl groups of one surface of said film are in the —SO$_2$M form wherein M is a halogen atom and the sulfonyl groups of the other surface of the film are in the —(SO$_3$)$_n$Me form wherein Me is a metallic cation or NH$_4$ and n is the valence of Me with a support material, and 2. applying a differential pressure to the contacted support material and film, the pressure on the opposite surface of the support material from that which is contacting said fluorinated polymer film being at least 5 inches of mercury less than the pressure on the surface of the fluorinated polymer film opposite to that contacting the support material, for a sufficient period of time to cause the support material which is in contact with said film to become completely encapsulated within the film of fluorinated polymer while heating the film and support material at from 240°–320°C.

2. The process of claim 1 wherein the support material is selected from the class consisting of fluorinated resin fabric, quartz fabric, glass mat and glass fabric.

3. The process of claim 2 wherein M is F, Me is Na, and n is one.

4. A process for preparing a laminate of a first layer of fluorinated polymer containing pendant side chains containing sulfonyl groups which are attached to carbon atoms which have at least one fluorine atom attached thereto wherein a majority of the sulfonyl groups are in the —(SO$_2$NH)$_m$Q form, Q being selected from the group consisting of H, cation of an alkali metal and cation of an alkaline earth metal and m being the valence of Q; a second layer of fluorinated polymer containing pendant side chains containing sulfonyl groups wherein the sulfonyl groups are in the —(SO$_3$)$_n$Me form, Me being a metallic cation or NH$_4$ and n being the valence of Me, said second layer being integral with said first layer; and a third layer of fluorinated polymer containing pendant side chains containing sulfonyl groups wherein the sulfonyl groups are in the —SO$_2$M form wherein M is a halogen atom, said third layer being integral with said second layer and containing support material completely encapsulated therein which comprises 1. contacting the —SO$_2$M surface of a film of fluorinated polymer containing pendant side chains containing sulfonyl groups with a support material, said film being integral and having (a) the sulfonyl groups of one surface of said film in the —SO$_2$M form wherein M is a halogen atom, (b) the sulfonyl groups of the other surface of the film attached to carbon atoms which have at least one fluorine atom attached thereto, a majority of said sulfonyl groups being in the —(SO$_2$NH)$_m$Q form wherein Q is H, cation of an alkali metal or cation of an alkaline earth metal and m is the valence of Q, and (c) said surfaces of said fluorinated polymer separated by fluorinated polymer containing pendant side chains containing sulfonyl groups wherein the sulfonyl groups are in the —(SO$_3$)$_n$Me form wherein Me is a metallic cation or NH$_4$ and n is the valence of Me; and 2. applying a differential pressure to the contacted support material and film, the pressure on the opposite surface of the support material from that which is contacting said fluorinated polymer film being at least 5 inches of mercury less than the pressure on the surface of the fluorinated polymer film opposite to that contacting the support material for a sufficient period of time to cause the support material to become completely encapsulated within the film of fluorinated polymer while heating the film and support material at from 240°–320°C.

* * * * *